United States Patent

Kadison et al.

[15] 3,668,130

[45] June 6, 1972

[54] CHROMIC ACID CONDITIONER FOR TREATMENT OF POLYMERIC RESIN SURFACES FOR ELECTROLESS PLATING

[72] Inventors: Leon A. Kadison, Pasadena; Eileen Maguire, San Gabriel, both of Calif.

[73] Assignee: Crown City Plating Co., El Monte, Calif.

[22] Filed: Oct. 31, 1969

[21] Appl. No.: 872,880

[52] U.S. Cl. ................................252/79.2, 117/47, 148/6.2, 156/2, 156/19, 204/20

[51] Int. Cl. ........................................H05k 1/00, B44d 5/04

[58] Field of Search ...............117/47 A; 148/6.2; 156/2, 19; 252/79.1, 79.2; 204/20, 30, 38; 106/287, 11

[56] References Cited

UNITED STATES PATENTS

| | | | |
|---|---|---|---|
| 2,886,471 | 5/1959 | Bruce et al. | 117/47 A |
| 3,317,330 | 5/1967 | Livingston et al. | 106/287 |

*Primary Examiner*—Jacob H. Steinberg
*Attorney*—Christie, Parker & Hale

[57] ABSTRACT

Aqueous chromic acid solutions containing from 1.1 to 1.3 kilograms of chromium trioxide per liter of solution as provided by the presence of trivalent chromium are used to condition polymeric resin surfaces for electroless plating.

11 Claims, 2 Drawing Figures

INVENTORS.
LEON A. KADISON
EILEEN MAGUIRE
BY
Christie, Parker & Hale
ATTORNEYS

CHROMIC ACID CONDITIONER FOR TREATMENT OF POLYMERIC RESIN SURFACES FOR ELECTROLESS PLATING

BACKGROUND OF THE INVENTION

The present invention relates to electroless plating of polymeric resin surfaces, more particularly to improving the bond strength between an electroless deposited metal coating and the polymeric resin substrate while maintaining excellent surface appearance.

Recently, considerable demand has developed for metal plating on non-conductive articles, particularly articles fabricated from organic polymers. In the finished product the desired characteristics of the polymer and the metal are combined to offer, thereby, the technical and aesthetic advantages of each. Although most polymeric resins are electrically non-conductive, a metal bond to the surface can be established by an initial plating operation known as "electroless plating." This is typically accomplished by conditioning the surface for plating by etching with a strong oxidizing acid seeding the surface by contact with a noble metal salt, e.g., a palladium chloride solution, then immersing the seeded surface in an auto-catalytic electroless solution where an initial coating of a conductive metal, e.g., copper and nickel, is established by chemical deposition. The metal coating forms, acts as a buss and allows a thicker metal coating to be built up electrolytically.

For some polymeric resin surfaces, for example, acrylonitrile-butadiene-styrene resins (hereinafter called ABS resins), the strong oxidizing acid conditions the substrate by chemical attack for the deposited metal coating. For other resins such as polypropelene anchor sites are generally believed to be established by micro-crazing, usually in combination with surface oxidation to produce hydrophylic groups.

Most oxidizing acid conditioners used are formulations based on mixtures of chromic acid and sulfuric acid or phosphoric acid. These oxidizing acid formulations are strong and generally attack the surface in an uneven manner, having thereby a detrimental effect on the appearance of the final article. In some instances, they undermine the integrity of the resin surface so that failure often occurs within the body of the resin as evidenced by low adhesion and extensive removal of the plastic with the metal plate during the conventional 90° peel test. They also have a limited life as reduction of chromic acid occurs in the presence of sulfate and phosphate ions.

Pure chromic acid has also been proposed as a conditioner. At close to the normal solubility of chromic acid in water, bond strengths to polymeric resins such as ABS resins have been substantially above that available from oxidizing solutions containing a mixture of acids. It is, however, a harsh etchant and the appearance of the surface of the conditioned polymeric article is too often most undesirable. Appearance does improve as the chromate ions reduce. Adhesions, however, very rapidly diminished and the chromic acid solution soon lost its effectiveness as a conditioning agent.

SUMMARY OF THE INVENTION

It has now been found that aqueous chromic acid solutions of unusually high hexavalent chromium content, namely, from about 1.1 to about 1.3 kilograms as chromium trioxide per liter of solution may be formulated for use in conditioning a polymeric resin substrate for electroless plating where there is present in solution a sufficient amount of trivalent chromium. For a desired chromium trioxide concentration the minimum amount of trivalent chromium required can be approximated by the expression $$y \sim 0.012 \times + 0.878$$

wherein $y$ is chromium trioxide concentration in kilograms per liter of solution and $x$ is trivalent chromium concentration in grams per liter of solution. The solutions so formed have a net chromic acid concentration above the normal solubility in water. The solutions provide resin to metal bond strengths at least equal to that available from normally saturated chromic acid solutions but are far more mild and uniform etchants. Quite surprisingly, resin substrate to be conditioned for electroless plating may be allowed to remain in the etchant for extended periods of time without a deleterious effect on appearance. Further articles can be etched several times as the etch will not destroy the integrity of the resin substrate.

As only one acid is used, namely, chromic acid, the solution is easy to maintain and the chromic acid which is withdrawn from the solution on the surface of the conditioned polymeric resinous articles may be recovered and used in the formulation of electrolytic chromium plating solutions. This also avoids waste in that spent conditioner, which is withdrawn from time to time, may also be easily conditioned for use as an electrolytic chromium plating solution rather than discarded as is necessary with mixed acid conditioners.

DRAWINGS

DESCRIPTION

According to the present invention, polymeric resin substrates are conditioned for electroless plating by contact with a chromic acid solution of unusually high hexavalent chromium content as provided by presence of trivalent chromium.

The chromic acid solutions used to condition the surface of a polymeric resin substrate for electroless plating according to the practice of this invention are solutions containing trivalent chromium and hexavalent chromium in the concentration of from about 1.1 to about 1.3 preferably from about 1.2 to about 1.25 kilograms calculated as chromium trioxide per liter of solution. The net chromic acid content which is above the normal chromic acid solubility in water at ambient and elevated temperatures is obtainable by the presence of trivalent chromium. The solutions may be further characterized by the dominant presence of hexavalent chromium in the form of the chromate as opposed to dichromate.

The amount of trivalent chromium present is not narrowly critical although to achieve a desired chromium trioxide solubility some minimum amount of trivalent chromium must be provided.

Figure 1:
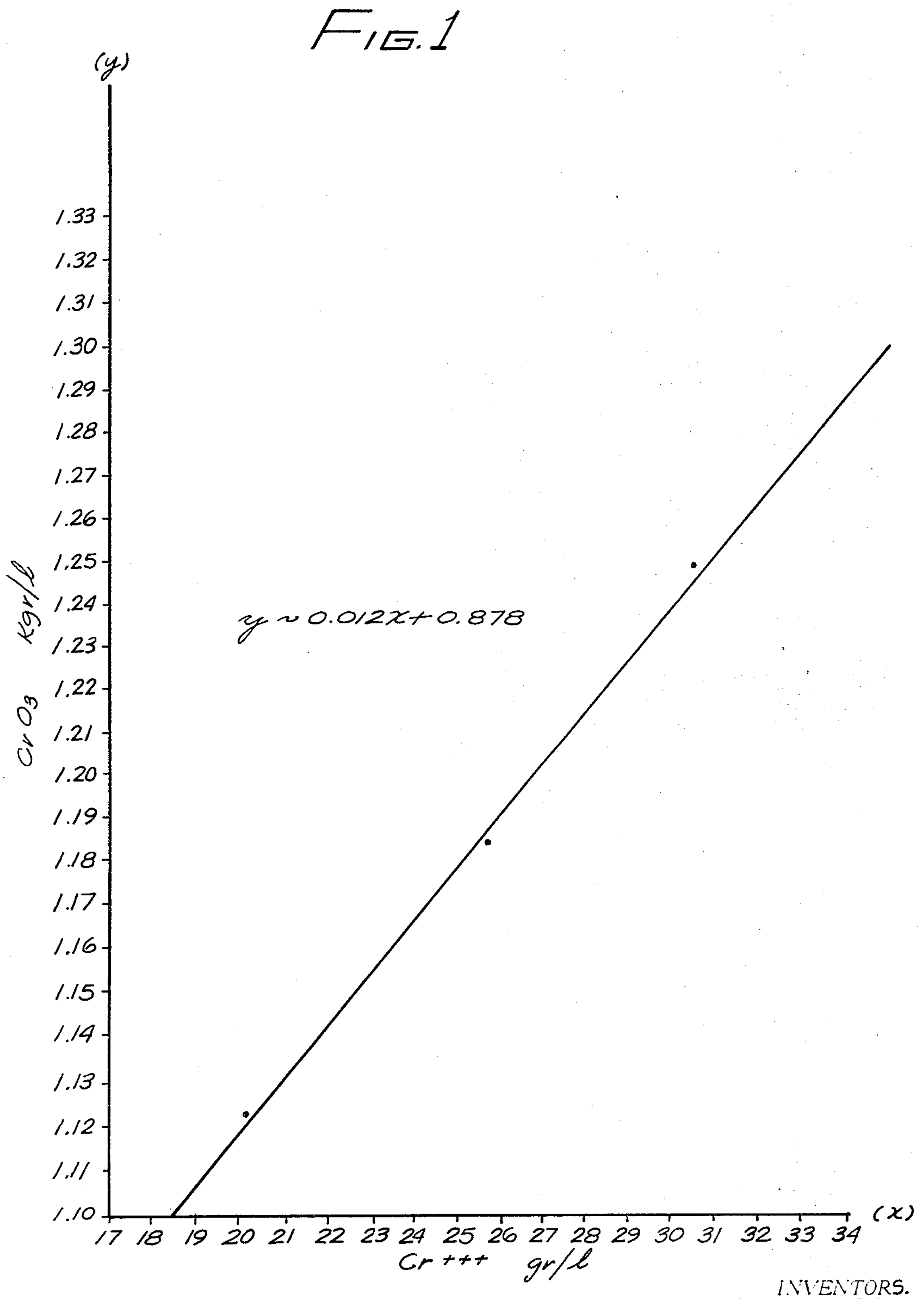
FIG. 1 is an approximate relation between desired chromium trioxide concentration and required minimum trivalent chromium concentration.

With reference now to FIG. 1, within the range of chromium trioxide concentrations desired, the minimum trivalent chromium required at 25° C may be approximated within the realm of experimental error by the expression $$y \sim 0.012 \times + 0.878 \quad (1)$$

wherein $y$ is the desired chromium trioxide in kilograms per liter of solution and $x$ is the approximate minimum trivalent chromium concentration. Preferably, however, trivalent chromium concentration is greater than the minimum, as trivalent chromium appears to act synergistically with hexavalent chromium with the range prescribed above to provide an unusually mild but effective etchant.

The aqueous chromic acid solutions used according to the practice of this invention may be conveniently initially prepared by formulating a normally saturated aqueous solution of chromic acid reducing a portion of hexavalent chromium ions to form trivalent chromium ions then adding additional chromium trioxide, preferably as chromic acid to provide a solution of desired hexavalent chromium assay. Reduction can be accomplished by the addition of a reducing agent which will not yield to the solution noble metal ions and adverse anions such as sulfate ions. Reducing agents which can readily be used include amongst others low molecular weight carboxylic acids, alcohols, aldehydes, ketones and mixtures thereof which oxidize to form simple unobtrusive molecules such as CO, $CO_2$, and $H_2O$. Carboxylic acids such as oxalic acid, formic acid, acetic acid, hydroxy acetic acid, maleic acid, and the like are preferred.

Trivalent chromium may also be provided by the addition of water soluble trivalent chrome donors such as chromic acetate. Again, where a trivalent chromium donor is used it is important to avoid the introduction of noble metal ions and sulfate ions as they reduce the solubility of hexavalent chromium. Equally convenient, however, the trivalent chromium may be formed by conditioning a polymeric resin surface with a normal chromic acid solution to form, thereby, trivalent chromium which permits the chromic acid concentration to be increased to the desired level.

In addition to increasing the solubility of chromic acid to form a solution of unusually high chromic acid concentration the presence of trivalent chromium ions appears to have a synergistic effect on the oxidizing behavior of chromic acid. As previously indicated, a normally saturated chromic acid solution will have a detrimental effect on the appearance of the conditioned article because its action is too harsh. Solutions of higher than normal chromic acid concentrations as provided by the presence of trivalent chromium ions behave as an unusually and unexpectedly uniform etchant for polymeric resin substrates in that conditioned polymeric resinous parts have excellent surface appearance when compared to prior art etchants and a normally saturated chromic acid solution. Further, the chromic acid solutions of this invention do not have an adverse effect on the surface of the polymeric resinous substrate and a part may be etched several times or left in conditioning solution for any desired length of time without affecting appearance. These benefits are gained, moreover, without any sacrifice of plastic to metal adhesion, as adhesions available using the high chromic acid solutions of this invention are at least equal to and normally greater than bond strengths heretofore available.

In addition, the chromic acid solutions of this invention show a strong tolerance for the presence of other metal ions such as iron and copper. The only exceptions are the noble metal ions.

As only one acid is used, the chromic acid oxidizing solutions of this invention are simple to maintain. Further, the solution does not break down as in the case of mixed acid etchants.

The polymeric resin surfaces which may be treated according to the practice of this invention include amongst other ABS resins, ethylene polymers, propylene polymers, styrene copolymers, polysulfones and the like.

With some, such as the ABS resin, the chromic acid etch of this invention uniformly attacks the surface of the resin chemically. With others, such as polypropylene, the oxidizing acid serves to microcraze the surface. For some of the polymeric resins substrates the chromic acid conditioner is used in combination with a suitable organic pre-etchant solution.

The temperature at which the chromic acid oxidizing agent of this invention may be used is not narrowly critical and may range, depending on the polymeric resin being conditioned, from room temperature to the boiling point of the acid solution or the deformation temperature of the resin substrate, whichever is lower.

Normally, however the conditioner is employed at a temperature above about 110° F, preferably from about 110° to about 200° F, and more preferably from about 140° to 190° F. Residence time is not narrowly critical and may range from a short dip up to about 60 minutes or more, preferably from about 5 to about 20 minutes depending upon the nature of the polymeric resin being conditioned for electroless plating.

Where the polymeric resinous surface has been pre-conditioned with an organic etch it should be preferably cleansed from the surface to prevent contamination of the chromic acid etch. This may be accomplished for some preconditioners, by a brief contact with a 1 to 5 normal acid or base wash.

Because the chromic acid oxidizing solution of this invention is highly viscous, a portion of the conditioner will be continuously withdrawn with the conditioned plastic articles and lost conditioner must be periodically replaced by the addition of make up conditioner, chromic acid or chromium trioxide to form the desired chromium trioxide assay.

Since trivalent chromium is already present, the conditioner will accept the solubalized added chromic acid or chromium trioxide to provide the desired chromium trioxide concentration. When the made up solution is dilute concentration to the desired assay may be conveniently accomplished by evaporation of excess water.

The amount of conditioner withdrawn daily in a typical operation by what is known as "dragout," is approximately about one to five per cent of the chromic acid etch solution. Because this solution is free of other adverse ions, such as sulfate ions, it may be conveniently conditioned for use and used as an electrolytic chrome plating solution.

Figure 2:
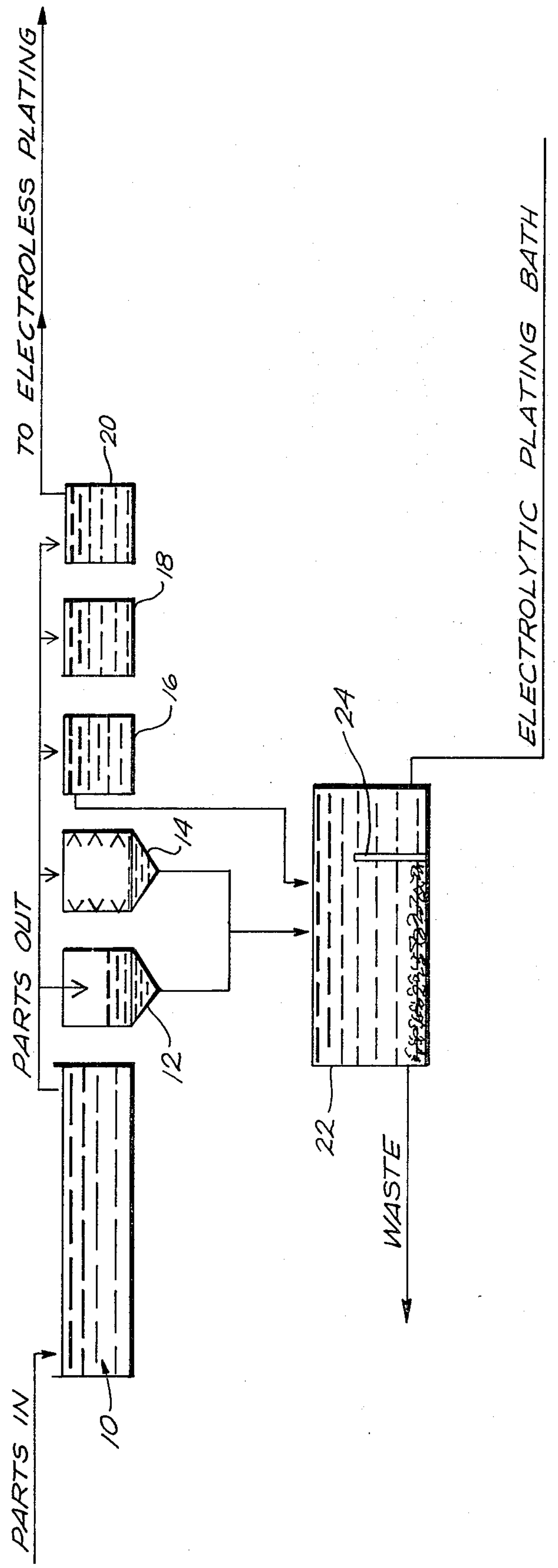
FIG. 2 is an illustration of a system wherein the chromic acid conditioning solution is used as both a conditioner for polymeric resin surfaces and as a electrolytic plating bath.

A combined chromic acid etch and chromic acid recovery system is illustrated in FIG. 2. With reference thereto, the plastic articles to be conditioned for electroless plating are first treated in the chromic acid conditioning tank 10 for the desired period of time. The parts are then withdrawn and passed to a dwell tank 12 where some of the withdrawn chromic acid solution is allowed to drain from the surface of the plastic articles. This step is optional, however, as it will be seen that the same result may be conveniently accomplished in spray rinse tank 14.

It is extremely important to the electroless plating of any plastic substrate to remove all traces of the conditioner and debris from the surface of the conditioned article. Debris and residual conditioner interfere with the subsequent steps of electroless plating with copper and nickel and have been found to have a deleterious effect on appearance and at times cause plating to separate from the polymer resin substrate. To materially aid in removing residue conditioner and any residual debris, the conditioned articles are passed to spray tank 14, where a high pressure water spray is applied as a first step in thoroughly cleansing the surface of the article. Following this, there may be one or more rinses in water, preferably deionized water in rinse tanks 16 and 18, and then a final cleansing with a mild alkaline cleanser, free of silicates in cleansing tank 20. Cleanser is generally maintained at a temperature from about 100° to about 130° F and residence time of the article is usually from about 3 to 5 minutes.

After final alkaline cleansing, the article may now be passed on to any of the electroless plating operations, usually employing either copper or nickel. Conveniently, the conditioned ABS article may be immersed in a solution of stannous chloride-hydrochloric acid to sensitize the plastic surface by absorption of stannous ions. This is generally followed by immersion in a solution of a noble metal salt, e.g., palladium chloride, to activate the ABS article by a reaction resulting in the reduction of the noble metal ions to the metal. The noble metal film on the article then acts as a catalyst in the electroless metal bath into which the activated article is passed.

A variety of electroless copper and nickel formulations may be used. For example, electroless copper formulations essentially consist of a soluble cupric salt, such as copper Rochelle salt; and alkali hydroxide for adjustment of pH; a carbonate radical as a buffer; and a reducing agent for the cupric ion, such as formaldehyde. The mechanism by which objects having catalyzed surfaces, for example, an article having catalytic palladium metal in its surface, as previously discussed, is plated autocatalytically in such solutions, has been explained in the literature, for example, U.S. No. 2,874,072, issued Feb. 17, 1959.

Following electroless plating the article may be electrolytically plated by conventional means with copper, nickel gold, silver, chromium and the like to provide the desired finish on the article. In such operations ultimate adhesive strength is dependent, in part, on metal to metal bond strength. It has been observed that aging the electroless plated ABS article for periods as long as 24 hours or more has a beneficial effect on metal to plastic bond strength. It has been observed, however, that this is offset in part by a tendency of the surface to oxidize and for absorbed salts to migrate to the surface of the article and dry. These phenomena have a deleterious effect on appearance and metal to metal bond strength. It has been found that immersion of the electrolessly plated article in an aqueous solution containing an anionic or nonionic surface active agent in an amount of from about 0.5 to about 2.0 per cent by volume provides a thin film of protective coating on the surface of the article during aging. Any water soluble anionic or nonionic surface active agent, such as, for instance, ethylene oxide condensates containing at least about 8 ethylene oxide groups; phosphate, sulfate and sulfonate modified ethylene oxides; alkyaryl sulfates; dimethyl octane diol; oxyethylated sodium salts; amine polyglycol condensates; modified linear alcohol ethoxylates; alkylphenol ethoxysulfates; sodium heptadecrylsulfates and the like, as well as mixtures thereof may be used. Generally, contact with the aqueous surfactant solution follows about a 4 to 5 minute immersion in tap water and a de-ionized water rinse. Providing the thin film prevents corrosion and drying out of absorbed salts. After aging for the desired period of time, usually 15 minutes or more using forced warm air to 4 hours or more at ambient temperatures, the protective coating is removed by contact with an alkaline cleanser and a brief rinse in sulfuric acid. When the coating has been removed, the electrolessly plated article is then electrolytically plated.

Returning now to FIG. 2, the chromic acid conditioner which collects in the drip tank 12, when present, and/or forced from the surface of the article in the spray rinse tank 14, are combined in collection tank 22 where there is added water, preferably de-ionized water, and ideally the overflow from rinse tank 16. The addition of water causes generally a precipitation of any solid matter extracted from the surface of the plastic article. The solid matter settles at the bottom of the tank for periodic discarding to waste and the dilute chromic acid is then passed by way of an overflow weir 24 to a typical electrolytic chrome plating make up system.

It has been observed in general that the conditioning solution in conditioning tank 10 will become more viscous with use. At some time interval, depending on the complexity of the resinous substrate being conditioned, all or part of the chromic acid conditioner should be supplanted by fresh chromic acid conditioner. The spent conditioner may be readily processed in the manner described above, with or without first decanting the spent conditioner from any sludge present, for use as an electrolytic chrome plating solution. This avoids waste and polution and maximizes economy of operation.

Accordingly, the chromic acid conditioning solution of this invention serves a dual function, first serving as the conditioner for the surface of polymeric resinous articles, and later as an ideal chrome plating solution. Had sulfate or other ions been present, however, this dual functionality would not have been available, as their presence would preclude its use in electrolytic plating.

Other systems for use of the chromic acid conditioner may also be employed. For instance, the dilute conditioner from drip tank 12 and spray tank 14 may be sent to an evaporator (not shown) after settling of solids for reconcentration and use as make up conditioner. Since trivalent chromium is present, concentration to desired chromic acid concentration is possible.

While nowise limiting, the following are examples of the use of the high chromic acid conditioners of the practice of this invention. Peel strengths were determined by pulling a 1 inch wide strip of plated metal from the polymeric resin substrate at an angle of 90° using a Dillon pull test apparatus.

EXAMPLE 1

A plaque molded of an ABS resin was washed and conditioned for 15 minutes by immersion in a chromic acid solution containing about 1.22 kilograms chromium trioxide per liter of solution and more than 28.5 grams of trivalent chromium per liter of solution formed by reduction of hexavalent chromium with oxalic acid. Another plaque molded of the same resin stock was immersed for an identical period of time in a chromic acid solution containing about 1.0 kilograms per liter of solution and essentially no trivalent chromium. Both plaques were spray washed, rinsed in deionized water and finally rinsed with an alkaline solution. Both were electrolessly plated with copper and electroplated with copper-nickel and chromium on adjacent racks in an electrolytic plating bath. The plaque conditioned with the chromic acid conditioner containing 1.22 kilograms chromium trioxide per liter of solution and more than 28.5 grams of trivalent chromium per liter of solution had an extremely uniform mirror-like plate with no surface flaws. The control sample conditioned with a trivalent chromium free solution containing 1.0 kilograms of chromium trioxide per liter had on 30 percent of one surface considerable roughness with an appearance analogous to extreme "orange peel" associated with lacquer finishes.

EXAMPLE 2

A plating grade propylene copolymer were conditioned in a chromic acid solution containing 1.22 kilograms chromium trioxide and more than 28.5 grams of trivalent chromium for 15 minutes at 190° F. After spray rinse, soaks and alkaline wash, the plaque was electrolessly plated in a conventional manner and electrolytically plated with copper. Average adhesion values were found to be 20 lbs./inch for a 4 mil thick plate.

EXAMPLE 3

Using the general procedure of Example 2 and a conditioning solution containing hexavalent chromium in an equivalent of 1.22 kilograms of chromium trioxide per liter of solution and more than 28.5 grams of trivalent chromium per liter of solution maintained at 180° F there were conditioned several propylene homopolymer plaques which were preconditioned with an organic pre-etch at 170° F. After copper plating on an electroless copper deposit there was obtained average adhesion values of 22.25 lbs./inch.

EXAMPLE 4

A pre-etched polysulfone plaque was conditioned for 7 minutes using the conditioner of Example 2. After plating an average peel strength of 22 lbs./inch was obtained.

What is claimed is:

1. A chromic acid solution for conditioning the surface of a polymeric resin for electroless plating which comprises an aqueous solution containing hexavalent chromium in an amount of from about 1.1 to about 1.3 kilograms as chromium trioxide per liter of solution and sufficient trivalent chromium to solubalize said chromium trioxide.

2. A chromic acid conditioning solution as claimed in claim 1 in which minimum trivalent chromium concentration is determined by the expression $$y \sim 0.012 \times + 0.878$$

wherein $y$ is chromium trioxide concentration kilograms per liter of solution and $x$ is hexavalent chromium concentration in grams per liter of solution.

3. A chromic acid conditioning solution as claimed in claim 1 in which chromium trioxide concentration is from about 1.2 to about 1.25 kilograms per liter of solution.

4. In a process for conditioning the surface of a polymeric resin for electroless plating by contacting the polymeric resin in at least a strong acid solution the improvement which comprises using as the acidic conditioner a chromic acid solution containing hexavalent chromium in an amount of from about 1.1 to about 1.3 kilograms per liter of solution as chrome trioxide and sufficient trivalent chromium to solubalize said chromium trioxide.

5. A process as claimed in claim 4 in which trivalent chromium is present in an amount at least sufficient to satisfy the approximate equation $$y \sim 0.012 \times + 0.878$$

wherein $y$ is chromium trioxide concentration in kilograms per liter of solution and $x$ is trivalent chromium concentration in grams per liter of solution.

6. A process as claimed in claim 4 in which chromium trioxide concentration is from about 1.2 to about 1.25 kilograms per liter of solution.

7. A process as claimed in claim 4 in which the chromic acid solution is maintained at a temperature of at least 110° F.

8. A process as claimed in claim 4 in which the chromic acid solution is maintained at a temperature of from about 110° to about 200° F.

9. A process as claimed in claim 4 in which the chromic acid solution is maintained at a temperature of from about 140° to 190° F.

10. A process as claimed in claim 4 in which the chromic acid solution removed with the polymeric resin article from acidic conditioner solution is diluted for use in electrolytic plating.

11. A process as claimed in claim 4 in which the chromic acid solution is supplanted at some time interval with fresh chromic acid solution and the chromic acid solution removed processed with dilution for use in electrolytic plating.

* * * * *